(12) United States Patent
Ichiyama et al.

(10) Patent No.: US 7,261,145 B2
(45) Date of Patent: Aug. 28, 2007

(54) SNOW MELTING PANEL

(75) Inventors: Takahiro Ichiyama, Sendai (JP);
Takayuki Magome, Tokyo (JP)

(73) Assignee: Nippon Steel Corporation, Tokyo (JP)

(*) Notice: Subject to any disclaimer, the term of this patent is extended or adjusted under 35 U.S.C. 154(b) by 72 days.

(21) Appl. No.: 11/207,230

(22) Filed: Aug. 18, 2005

(65) Prior Publication Data
US 2006/0042781 A1    Mar. 2, 2006

(30) Foreign Application Priority Data
Aug. 19, 2004  (JP)  .......................... P 2004-239153
Jun. 22, 2005  (JP)  .......................... P 2005-181597

(51) Int. Cl.
*F28F 19/06* (2006.01)
(52) U.S. Cl. ...................... 165/133; 165/134.1; 165/45
(58) Field of Classification Search .................. 165/45, 165/133, 134.1
See application file for complete search history.

(56) References Cited

U.S. PATENT DOCUMENTS

| | | | | |
|---|---|---|---|---|
| 4,011,989 A | * | 3/1977 | Diggs | 237/59 |
| 4,238,532 A | * | 12/1980 | Dreulle | 427/309 |
| 4,693,300 A | * | 9/1987 | Adachi | 165/45 |
| 4,880,051 A | * | 11/1989 | Ohashi | 165/45 |
| 6,736,191 B1 | * | 5/2004 | Lindberg et al. | 165/45 |

FOREIGN PATENT DOCUMENTS

| | | | |
|---|---|---|---|
| JP | S5441235 | | 4/1979 |
| JP | 59-32728 | * | 2/1984 |
| JP | 60238041 | | 11/1985 |
| JP | 02194280 | | 7/1990 |
| JP | 03042136 | | 2/1991 |
| JP | H0318914 | | 2/1991 |
| JP | 05148607 | | 6/1993 |
| JP | 07003714 | | 1/1995 |
| JP | 07109704 | | 4/1995 |
| JP | 11246942 | | 9/1999 |

* cited by examiner

*Primary Examiner*—Teresa J. Walberg
(74) *Attorney, Agent, or Firm*—Dorsey & Whitney LLP

(57) ABSTRACT

A snow melting panel has a piping arrangement that includes straight pipe lines and U-shaped bend sections is provided. The panel can be sized such that the parallel length of the straight pipe lines is 300 to 5000 mm, and the perpendicular span of the straight pipe lines is 100 to 4000 mm. The piping arrangement may have a hot-dip galvanized layer or a highly corrosion resistant galvanized layer formed or provided only on the outer surface of the piping arrangement. For example, the gap between adjacent pipes in the straight pipe lines is 100 to 300 mm. In addition, the straight pipe lines and the bend sections can be made from a single long pipe. The piping arrangement may be made from a steel pipe with a silicon content of less than 0.05 wt %, or not less than 0.15 wt % and not more than 0.20 wt %.

6 Claims, 1 Drawing Sheet

SNOW MELTING PANEL

CROSS-REFERENCE TO RELATED APPLICATION(S)

Figure 1:
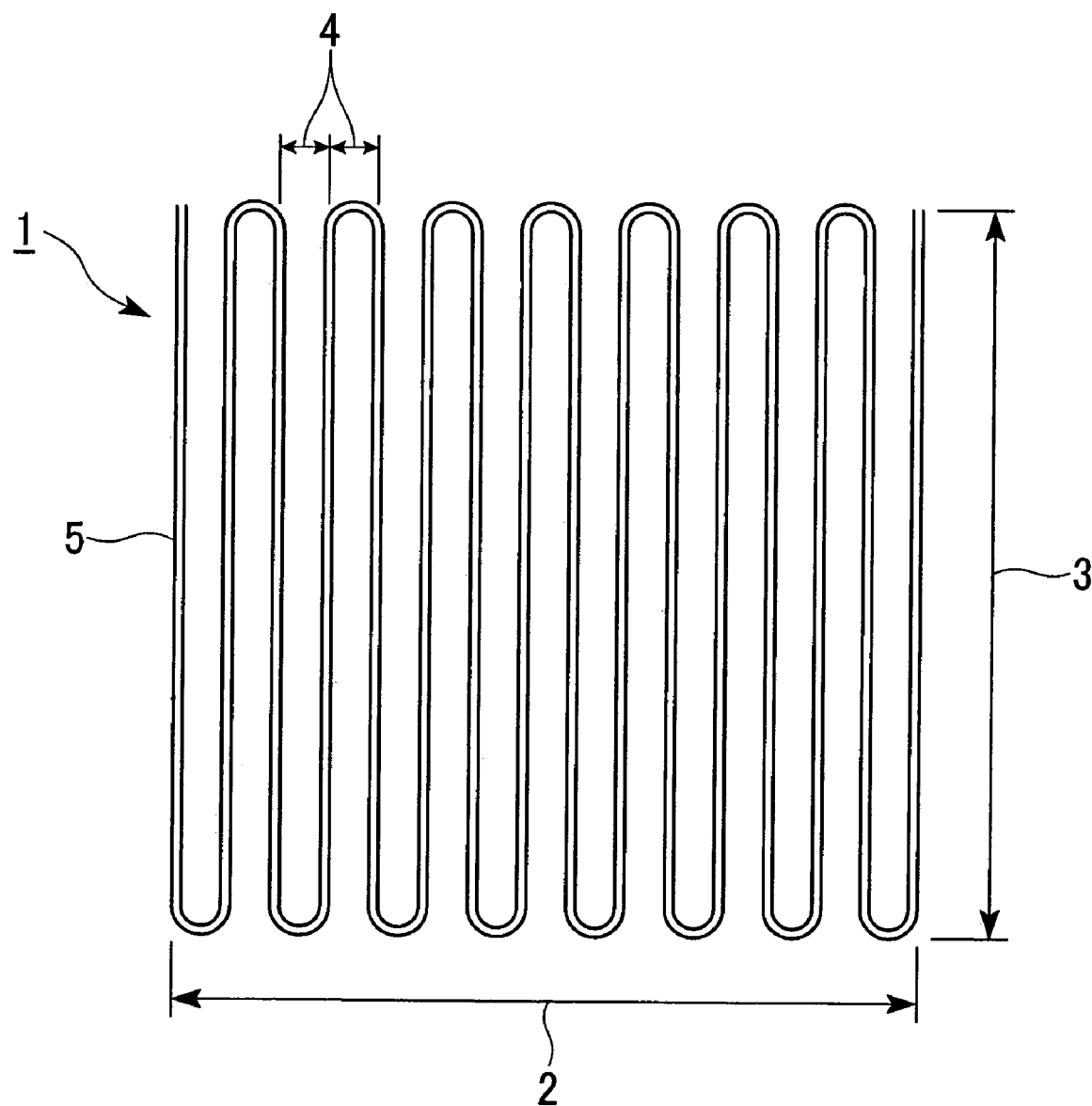

This application claims priority from Japanese Patent Application No. 2004-239153, filed Aug. 19, 2004, and Japanese Patent Application No. 2005-181597, filed Jun. 22, 2005, the entire disclosure of which is incorporated herein by reference.

FIELD OF THE INVENTION

The present invention relates to a snow melting panel having a piping for passing therethrough a heating medium such as ground water, warm water or an antifreezing solution in order to melt snow on roads, bridges and the like and prevent freezing of roads, bridges and the like in cold districts.

DESCRIPTION OF RELATED ART

Conventional snow melting devices heat a road surface with an embedded hot water pipe or heating device in order to melt snow on roads, bridges and the like and prevent freezing of roads, bridges and the like (described in Japanese Unexamined Patent Application, First Publication No. H02-194280). Such snow melting devices pass therethrough a heating medium such as ground water, hot water and the like, using materials such as a resin pipe (described in Japanese Unexamined Patent Application, First Publication No. H07-109704), metal pipe (described in Japanese Unexamined Patent Application, First Publication No. H07-3714), and galvanized steel pipe (described in Japanese Unexamined Patent Application, First Publication No. H03-42136; and Japanese Unexamined Patent Application, First Publication No. H02-194280).

A resin pipe may have the problem of inferior strength and heat resistance. Also, in the case of roads paved with asphalt, since water containing snow melting agents seeps into the ground from the asphalt, a corrosion resistance may be needed for the snow melting panel or the pipe used in the snow melting panel.

The need therefore arises to use galvanized steel pipe with excellent corrosion resistance. The method proposed in Japanese Unexamined Patent Application, First Publication No. H03-42136 is one in which straight pipe that is hot-dip galvanized on the inner and outer surfaces is formed into a zigzag shape by bending work or welding.

Japanese Unexamined Patent Application, First Publication No. S54-41235, Japanese Unexamined Patent Application, First Publication No. H11-246942, and Japanese Unexamined Patent Application, First Publication No. H05-148607 describe steel pipes in which only the outer surface or inner surface thereof is galvanized, and methods of manufacture.

Devices that bend a long steel pipe with no welds into a zigzag shape have been describe in, e.g., Japanese Unexamined Patent Application, First Publication No. S60-238041, and Japanese Unexamined Utility Model Application, First Publication No. H03-18914. However, a method and device for applying hot-dip galvanizing to a long steel pipe have not been described therein.

Bending or welding a straight pipe that is hot-dip galvanized on the inner surface and outer surface to form such pipe into a zigzag shape (as described in Japanese Unexamined Patent Application, First Publication No. H03-42136) may take time and effort, and can be costly. In addition, when an antifreezing solution is used as a heating medium, the galvanized layer on the inside of the pipe chemically reacts with the antifreezing solution, causing the galvanized layer to dissolve. The method described in Japanese Unexamined Patent Application, First Publication No. H03-42136 relates to welding together hot-dip galvanized straight pipes and U-shaped bent pipes, which can damage the galvanized layer at the welding portion on the outer surface of the pipes, thereby deteriorating the corrosion resistance. Consequently, it is necessary to repair the damaged portions of the galvanized layer.

Executing bending work on hot-dip galvanized long steel pipe using the bending devices (e.g., as disclosed in Japanese Unexamined Patent Application, First Publication No. S60-238041, and Japanese Unexamined Utility Model Application, First Publication No. H03-18914) may lead to damage such as exfoliation of the surface plating layer at the bending portions, which impairs corrosion resistance.

Exemplary embodiments of the present invention address the above-described deficiencies and problem, and provide a snow melting panel that enables use of an antifreezing solution as a heating medium, having excellent corrosion resistance by, e.g., not being susceptible to damage such as exfoliation of the plating on steel pipe used for the panel, and having minimal gray coating (a developed Fe—Zn alloy layer exposed to the surface of galvanized layer).

SUMMARY OF THE INVENTION

The above-described problems and deficiencies can be solved by with the exemplary embodiments of the present invention as described herein.

For example, one exemplary embodiment of the present invention provides a snow melting panel which has a piping arrangement that includes straight pipe lines and U-shaped bend sections connecting the straight pipe lines. The panel may be sized such that a parallel length of the straight pipe lines is 300 to 5000 mm, and the perpendicular span of the straight pipe lines is 100 mm to 4000 mm. The piping arrangement have a hot-dip galvanized (zinc plated) layer or a highly corrosion resistant galvanized layer formed only on the outer surface thereof.

In the snow melting panel, a gap between adjacent pipes in the straight pipe lines may be 100 to 300 mm.

In the snow melting panel, the straight pipe lines and the bend sections may be made from a single long pipe. The piping of the snow melting panel may be a steel pipe with a silicon content of (i) less than 0.05 wt %, or (ii) not less than 0.15 wt % and less than 0.20 wt %.

The piping arrangement used in the snow melting panel may have straight pipe lines and U-shaped bend sections. The external shape of the piping can be designed such that the parallel length of the straight pipe lines is 300 mm to 5000 mm, and the perpendicular span of the straight pipe lines is 100 mm to 4000 mm. The piping may have a hot-dip galvanized layer and/or a highly corrosion resistant galvanized layer only on the outer surface of the piping. It is preferable for the gap between adjacent pipes in the straight pipe lines to be 100 to 300 mm. Also, it is preferable for the straight pipe lines and the bend sections to be made from a single long pipe. Also, it is preferable for the steel pipe to have a silicon content of less than 0.05 wt %, or more than 0.15 wt % but less than 0.20 wt %.

The exemplary embodiments of the present invention provide a low-cost snow melting panel that can be used embedded in asphalt where corrosion resistance is sought and enables use of an antifreezing solution as a heating medium, and so its industrial contribution is significant.

These and other objects, features and advantages of the present invention will become apparent upon reading the following detailed description of embodiments of the invention, when taken in conjunction with the appended claims.

BRIEF DESCRIPTION OF THE DRAWING(S)

FIG. 1 is a top view of an exemplary embodiment of a frame format of a snow melting panel according to the present invention.

DETAILED DESCRIPTION OF THE INVENTION

FIG. 1 shows an exemplary embodiment of a snow melting panel 1 according to the present invention. A piping arrangement 5 used in the exemplary snow melting panel 1 may have straight pipe lines and U-shaped bend sections. To facilitate handling during the transportation and placement, the size of the panel 1 can be such that a parallel length 3 of the straight pipe lines is 300 mm to 5000 mm, and a perpendicular span 2 of the straight pipe lines is 100 mm to 4000 mm. Moreover, the piping arrangement 5 which may be used in the snow melting panel 1 of the present invention has a hot-dip galvanized layer only on its outer surface, with no hot-dip galvanized layer provided on the inside portion thereof. This provides an excellent corrosion resistance even when embedded in asphalt into which water containing snow melting agents seeps, and enables uses of an antifreezing solution as a heating medium. In accordance with the length of the road, a particular number of the snow melting panels may be coupled together for use.

As shown in FIG. 1, a gap 4 wider than 300 mm provided between adjacent pipes in the straight pipe lines can lead to insufficient melting of snow on roads and bridges and insufficient prevention of freezing. Conversely, a gap narrower than 100 mm between adjacent pipes in the straight pipe lines may cause the temperature of the heating medium to fall near an outlet port, which can partially lead to insufficient melting of snow and prevention of freezing. Thus, it is preferable for the gap between adjacent pipes in the straight pipe lines to be in a range of 100 mm to 300 mm.

It is preferable for the bending work to be applied to a single long pipe, e.g., with no welds between the straight pipe lines and bend sections. this allows for a suppression of the corrosion of welds. Using a long pipe can also greatly reduce the number of joints between pipes, thereby reducing construction cost.

The galvanized layer on the outer surface of the piping arrangement 5 used in the exemplary snow melting panel 1 of the present invention will likely be unsusceptible to damage such as exfoliation, even at the bend sections. Whether the piping arrangement 5 is made into a panel shape by welding the linear steel pipes and U-shaped steel pipes together or bending a long steel pipe into a zigzag (e.g., meandering) pattern, by plugging both ends and hot-dip galvanizing, the panel 1 can be provided as having a galvanized coating only on the outer surface that will generally not undergo damage such as exfoliation, even at the bend sections.

Accordingly, in the case of the piping arrangement 5 that forms the exemplary snow melting panel 1 of the present invention being made into a panel by bending a long steel pipe into a zigzag pattern, no damage would be encountered such as exfoliation of the galvanized coating or plating repair marks on the bend sections. In addition, in the case of linear steel pipes and steel pipes bent into a U-shape being welded into a panel shape, no plating repair marks would be encountered in the welding portions of the steel pipes.

The plating layer on the outer surface of the piping arrangement 5 for the exemplary snow melting panel 1 of the present invention may be plated by a general hot-dip galvanizing. As the plating layer, a highly corrosion resistant hot-dip galvanizing can also be used that includes 2 to 19% aluminum, 1 to 10% magnesium, and 0.01 to 2% silicon (with the combined content of aluminum and magnesium being at most 20%). This highly corrosion resistant hot-dip galvanizing is used for galvanized steel sheets sold under the trade name of "SuperDyma (registered trademark)" by Nippon Steel Corporation.

The preferred conditions of the chemical composition of the steel pipe used as the piping arrangement 5 for the exemplary snow melting panel 1 of the present invention are described herewith below.

When forming the galvanized layer on the outer surface of a steel pipe, a relationship exists between the silicon content in the steel pipe, gray coating and amount of zinc deposited. The gray coating and amount of zinc deposited can be at a maximum with a silicon content of 0.07%. When the silicon content of the steel pipe is less than 0.05 wt % or not less than 0.15 wt %, the mutual diffusion of iron and zinc is generally suppressed and gray coating is ameliorated, thereby enhancing the commercial value thereof. However, a silicon content exceeding 0.20 wt % can lead to weld cracks due to silicon oxide residue at the junction portion between the pipes. Accordingly, it is preferable that the silicon content of steel be less than 0.05% wt %, or not less than 0.15 wt % and not more than 0.20 wt %.

EXAMPLES

Exemplary snow melting panels have been fabricated using long (about 50,000 mm) and short (about 2,500 mm) lengths of carbon-steel pipes conforming to JIS G3452 having an outer diameter of 21.7 mm and wall thickness of 2.8 mm. The straight pipe lines of the snow melting panel have a parallel length of 2,500 mm, a perpendicular span of 2,500 mm and a gap of 200 mm between the adjacent straight pipe lines. The panels were then embedded in a road to evaluate its performance. Steel pipes of various silicon contents were used for the examples of the present invention and comparative examples, with the pipes of the former being galvanized on the outer surface only, and the pipes of the latter being galvanized on both the inner and outer surfaces.

Table 1 shows the panel pipe characteristics and manufacturing conditions and evaluation results.

TABLE 1

| Examples | | Pipe Plating Surface | Piping Length[1] | Chemical Components (wt %) | | | Plating Exfoliation/ Partial Corrosion | Gray coating | Plating Consumption, Construction Cost |
| --- | --- | --- | --- | --- | --- | --- | --- | --- | --- |
| | | | | C | Si | Mn | | | |
| Examples of the Present Invention | 1 | Outer | Long | 0.127 | 0.100* | 0.45 | None | Nominal | Low |
| | 2 | Outer | Long | 0.128 | 0.005 | 0.44 | None | None | Low |
| | 3 | Outer | Long | 0.127 | 0.04 | 0.45 | None | None | Low |
| | 4 | Outer | Long | 0.127 | 0.171 | 0.46 | None | None | Low |

TABLE 1-continued

| Examples | | Pipe Plating Surface | Piping Length[1)] | Chemical Components (wt %) | | | Plating Exfoliation/ Partial Corrosion | Gray coating | Plating Consumption, Construction Cost |
|---|---|---|---|---|---|---|---|---|---|
| | | | | C | Si | Mn | | | |
| Comparative Examples | 1 | Inner, Outer* | Short* | 0.127 | 0.005 | 0.45 | Present | None | High |
| | 2 | Inner, Outer* | Short* | 0.128 | 0.12* | 0.46 | Present | Nominal | High |
| | 3 | Inner, Outer* | Long | 0.127 | 0.001 | 0.45 | Present | None | Moderate |
| | 4 | Inner, Outer* | Short* | 0.127 | 0.001 | 0.45 | Present | None | High |

*Possibly outside the preferred exemplary range of the present invention
Tube length: Long tube (entire length of one panel) approximately 50,000 mm
Short Tube (parallel length of straight pipe lines) approximately 2,500 mm To evaluate the state of plating exfoliation/corrosion, a snow melting panel was manufactured and the state of exfoliation/corrosion of the galvanizing of the panel piping was observed after running water containing an antifreezing solution through the panel piping for approximately one year. Examples 1 to 4 of the present invention were galvanized on only the outer surface of the piping, and so there was no exfoliation of plating on the inside, and absolutely no partial corrosion was observed. However, both exfoliation of plating inside the piping and partial corrosion were observed in Comparative Examples 1 to 4 which were galvanized on both the inner and outer surface.

Gray coating was evaluated by hot-dip galvanizing the piping in each of the examples and observing whether there was any gray coating. According to the certain examples of the present invention, no gray coating was evident with a silicon content of steel less than 0.05% wt %, or not less than 0.15 wt % and not more than 0.20 wt %. A small amount of gray coating was observed in the case of a silicon content of 0.05 wt % or more and less than 0.15 wt % (Example 1 of the present invention and Comparative Example 2).

Examples 1 to 4 of the present invention used long pipes, and since galvanizing was only applied to the outer surface of the piping, consumption of plating materials and construction costs were low. By contrast, Comparative Example 3, in which a long pipe was also used, consumption of plating materials and construction costs were only rated as moderate because both the inner and outer surfaces of the pipe were galvanized. In Comparative Examples 1, 2 and 4, in which short pipes were used, consumption of plating materials and construction costs were evaluated as high.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims. The entire disclosures of every publication and application referenced above are incorporated herein by reference.

What is claimed is:

1. A snow melting panel, comprising:
    a piping arrangement which comprises straight pipe lines and U-shaped bend sections connecting the straight pipe lines; and
    a hot-dip galvanized layer that is provided only on an outer surface of the piping arrangement,
    wherein the panel is sized such that parallel length of the straight pipe lines is 300 to 5000 mm and perpendicular span of the straight pipe lines is 100 to 4000 mm.

2. The snow melting panel according to claim 1, wherein the gap between adjacent ones of the piping arrangement in the straight pipe lines is 100 to 300 mm.

3. The snow melting panel according to claim 1, wherein the straight pipe lines and the bend sections are made from a single long pipe.

4. The snow melting panel according to claim 1, wherein the piping arrangement is made from a steel pipe having a silicon content of less than 0.05 wt %.

5. The snow melting panel according to claim 1, wherein the piping arrangement is made from a steel pipe having a silicon content that is at least 0.15 wt % and at most 0.20 wt %.

6. The snow melting panel according to claim 1, wherein the galvanized layer is a highly corrosion resistant galvanized layer.

* * * * *